(No Model.)  
6 Sheets—Sheet 1.

D. C. STOVER.
TYPE WRITING MACHINE.

No. 446,719. Patented Feb. 17, 1891.

(No Model.) 6 Sheets—Sheet 2.

D. C. STOVER.
TYPE WRITING MACHINE.

No. 446,719. Patented Feb. 17, 1891.

Witnesses
Harry S. Rohrer
Sawyer Dunpe

Inventor
D. C. Stover
By his Attorneys
Wiles & Greene (No Model.) 6 Sheets—Sheet 3.
D. C. STOVER.
TYPE WRITING MACHINE.
No. 446,719. Patented Feb. 17, 1891.
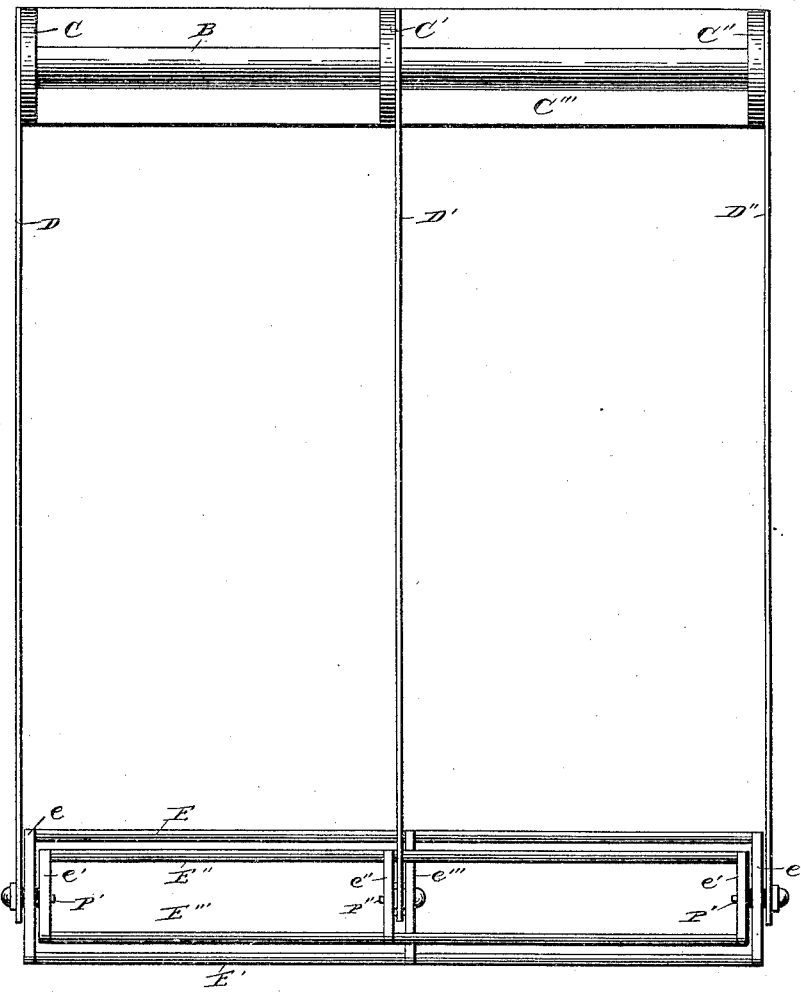

(No Model.) 6 Sheets—Sheet 4.

D. C. STOVER.
TYPE WRITING MACHINE.

No. 446,719. Patented Feb. 17, 1891.

Witnesses
Inventor
By his Attorneys (No Model.)  6 Sheets—Sheet 5.
D. C. STOVER.
TYPE WRITING MACHINE.
No. 446,719.  Patented Feb. 17, 1891.
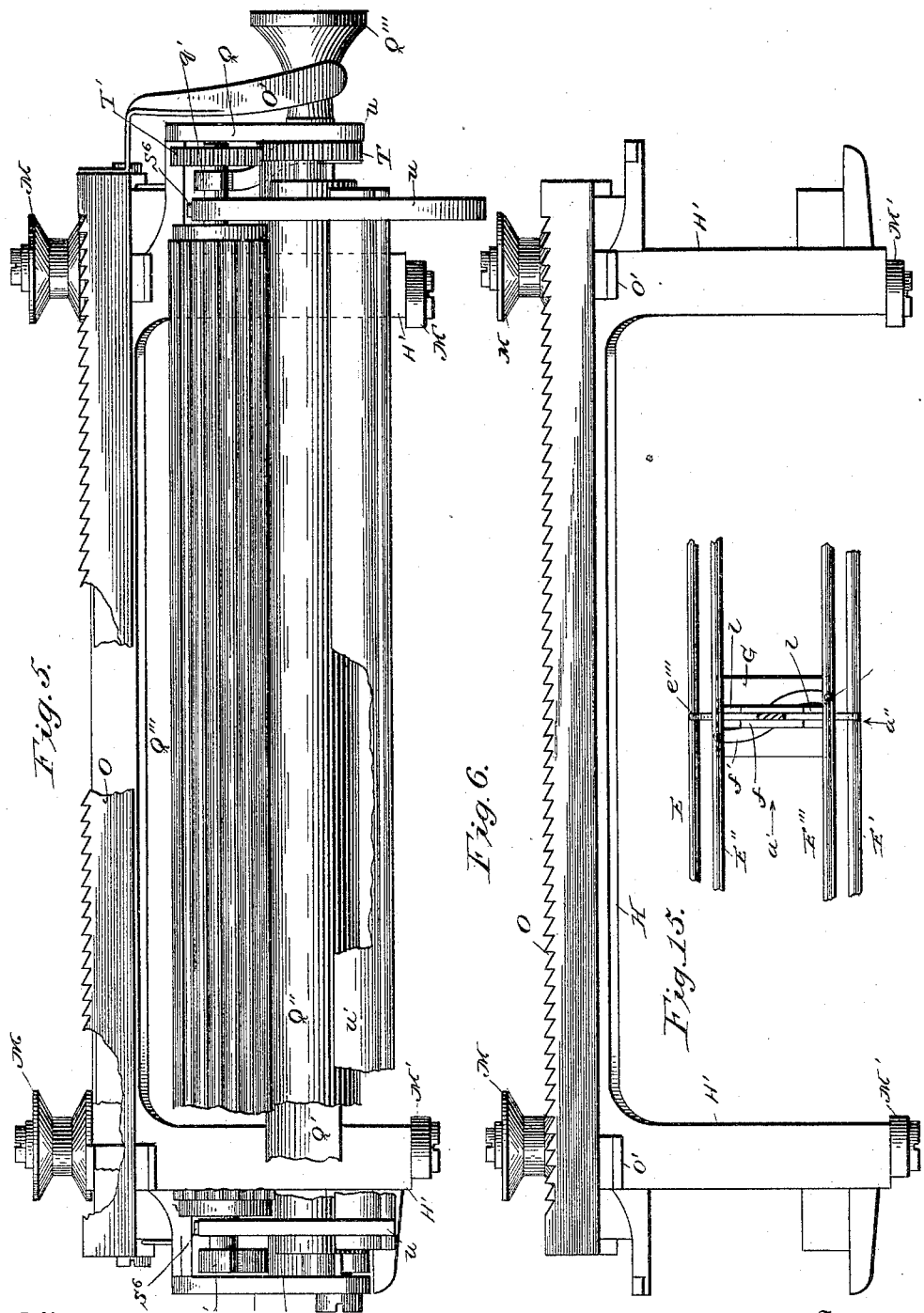

(No Model.) 6 Sheets—Sheet 6.
D. C. STOVER.
TYPE WRITING MACHINE.
No. 446,719. Patented Feb. 17, 1891.
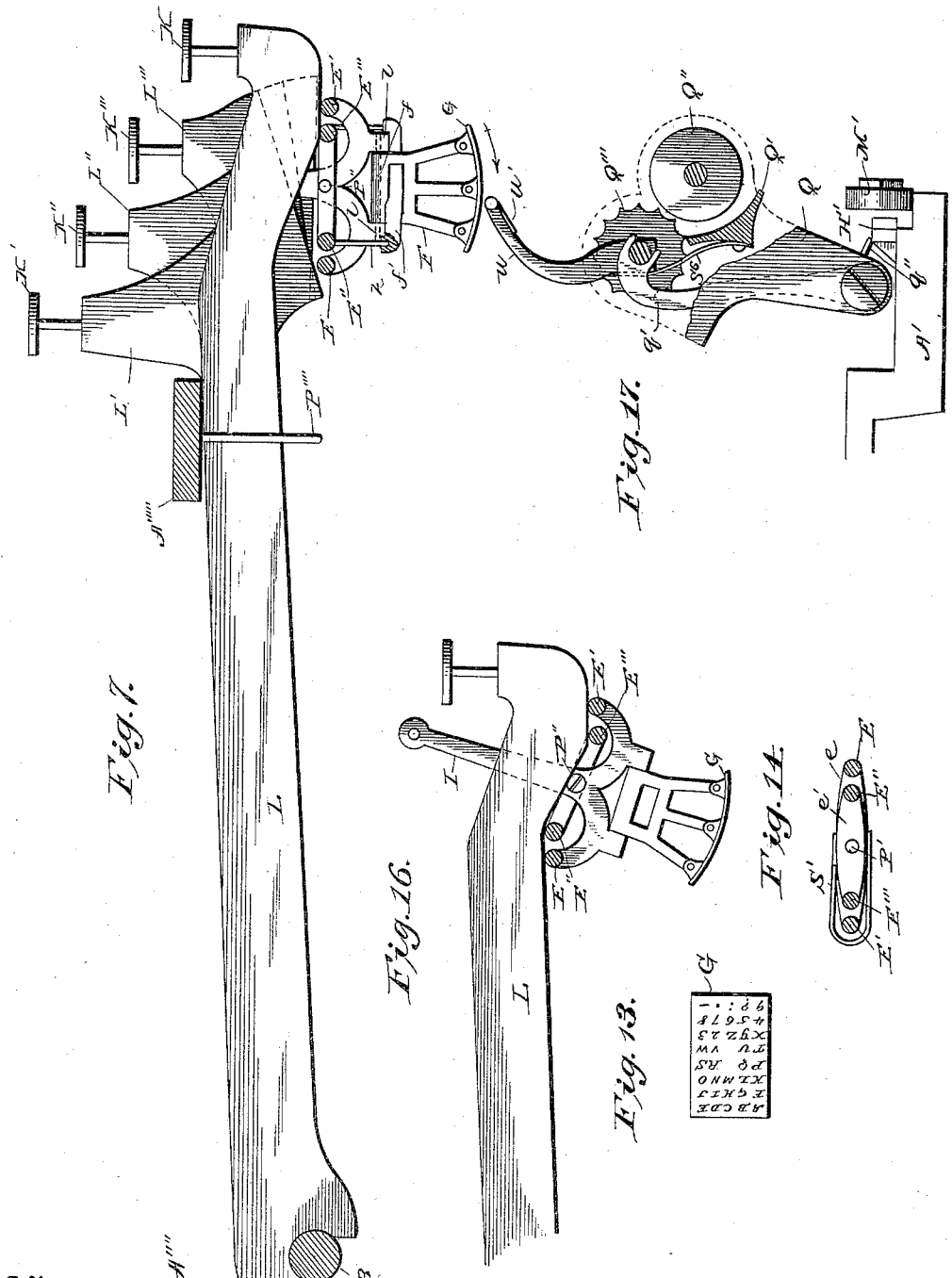

UNITED STATES PATENT OFFICE.

DANIEL C. STOVER, OF FREEPORT, ILLINOIS.

TYPE-WRITING MACHINE.

SPECIFICATION forming part of Letters Patent No. 446,719, dated February 17, 1891.

Application filed March 15, 1889. Serial No. 303,395. (No model.)

*To all whom it may concern:*

Be it known that I, DANIEL C. STOVER, a resident of Freeport, in the county of Stephenson and State of Illinois, have invented certain new and useful Improvements in Type-Writing Machines; and I do hereby declare the following to be a full, clear, and exact description of the invention, such as will enable others skilled in the art to which it pertains to make and use the same.

My invention relates to improvements in type-writing machines, and is fully described and explained in this specification and shown in the accompanying drawings, in which—

Figure 1:
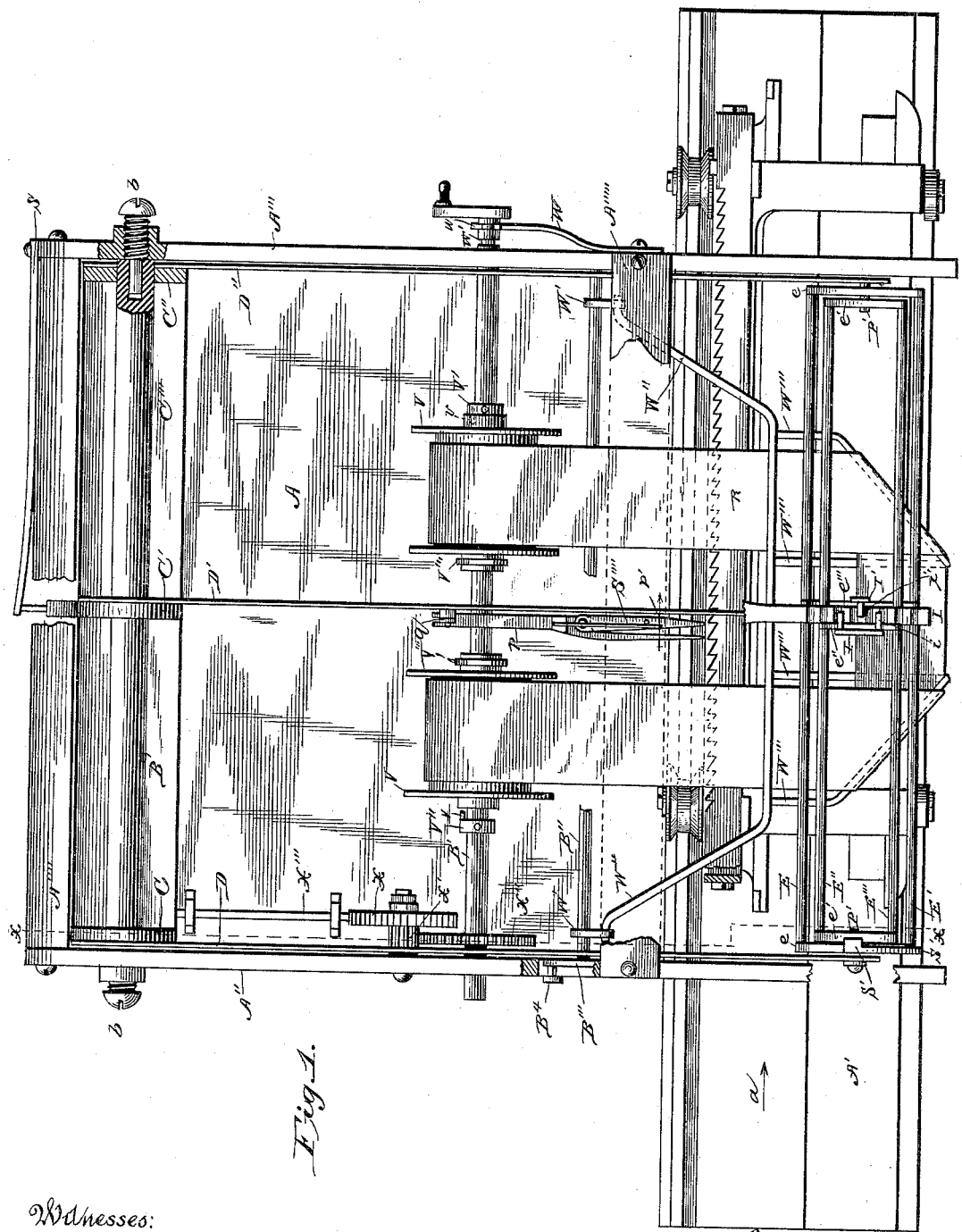
Figure 2:
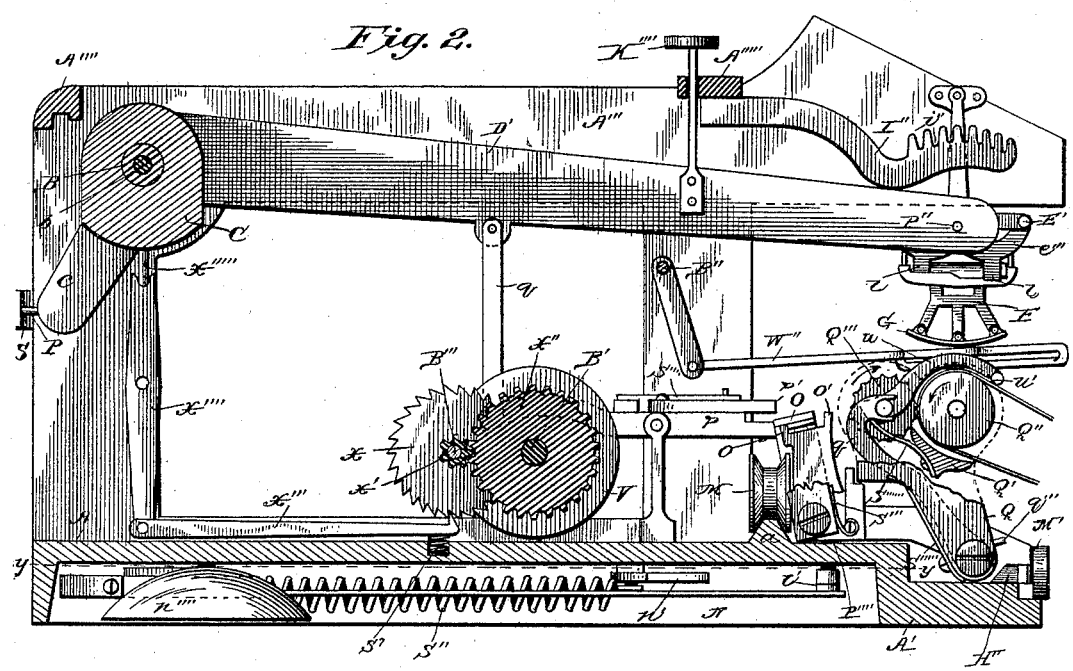
Figure 8:
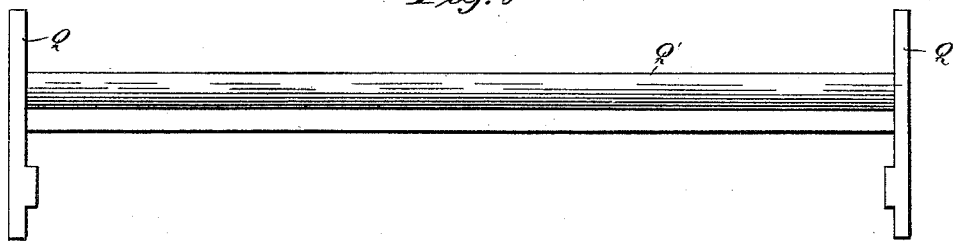
Figure 9:
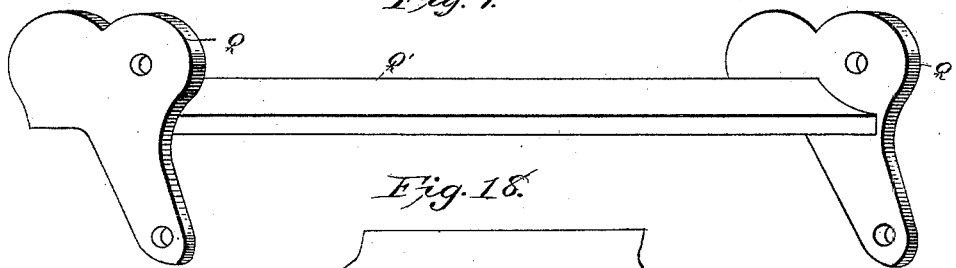
Figure 18:
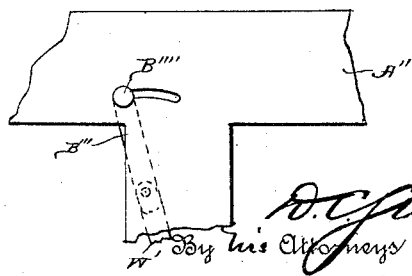
Figure 4:
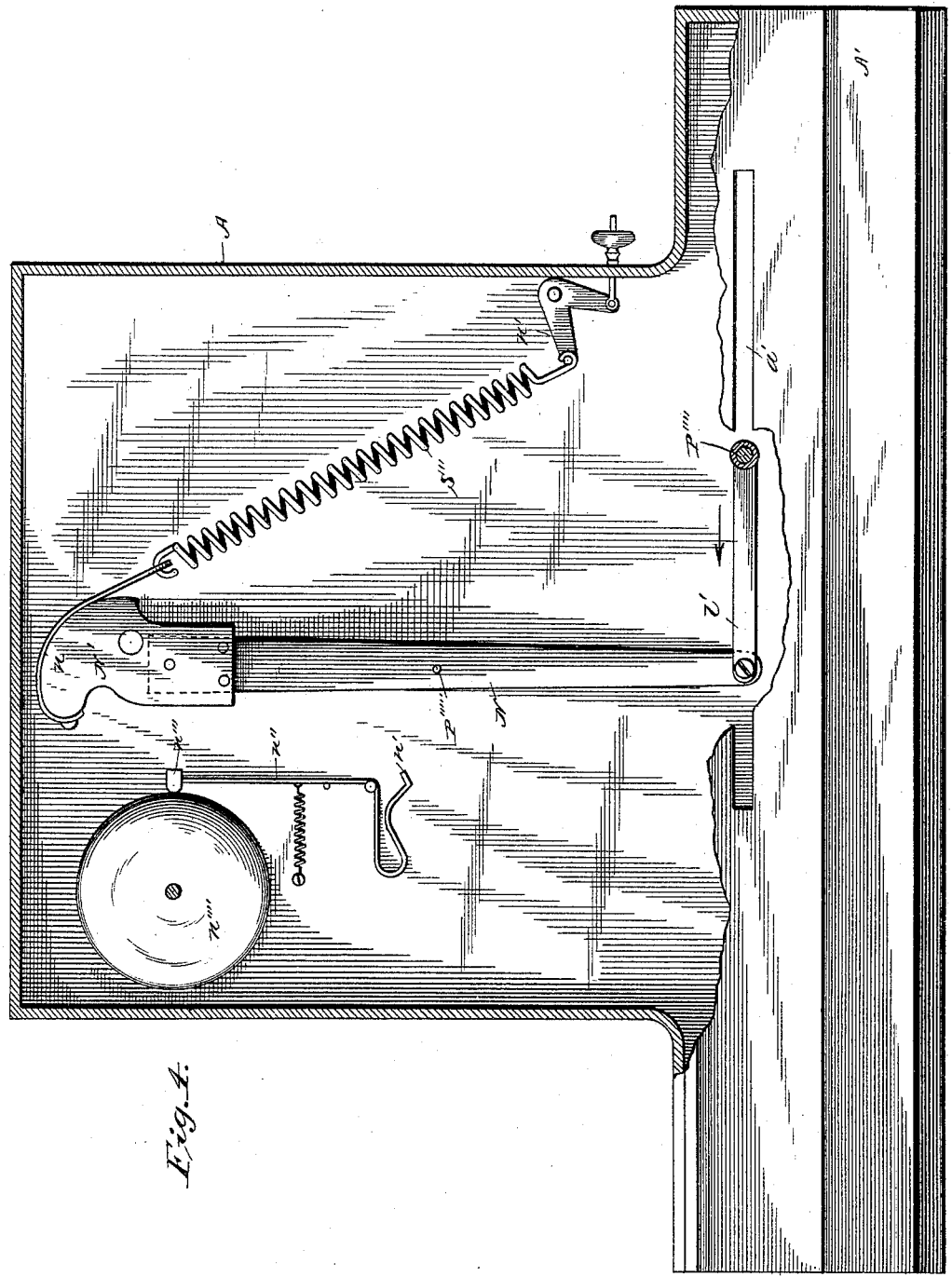

Figure 1 is a top plan of the machine. Fig. 2 is a vertical section through the line X X, Fig. 1, the view being in the direction indicated by the arrow in Fig. 1. Fig. 3 is a top plan of the oscillating frame which supports the type-actuating keys and the type-block of the machine. Fig. 4 is a top plan of the operating parts situated in the base of the machine, the greater portion of the top of the base being cut away by a horizontal plane passed through the base on the line Y Y, Fig. 2. Fig. 5 is a top plan of the carriage of the machine. Fig. 6 is a top plan of the main frame of the carriage with the letter-space ratchet-bar in operative position thereon. Fig. 7 is a vertical section illustrating the type-actuating levers and keys and the position and means of suspension of the type-block. Fig. 8 is a front elevation of the swinging paper-guide which is mounted on the carriage and carries the paper feeding and supporting rollers. Fig. 9 is a perspective view of same. Figs. 10, 11, 12, 13, 14, 15, 16, 17, and 18 are views illustrating details of construction.

In the views, A is a base, preferably hollowed, to receive certain working parts of the machine, and provided at its front with a transverse extension A', on which is formed a track $a$ for the wheels of a traveling carriage adapted to support the paper and the paper-feeding devices.

On the base is erected a frame formed of side pieces $A^2 A^3$, connected at the rear by a cross-bar $A^4$ and near its front end by a similar cross-bar $A^5$. In the frame thus formed is mounted near the upper rear corner a transverse shaft B, held in place by set-screws, which enter the ends of the shaft, as shown in Fig. 1. On this shaft is rigidly fastened a series of vertical hubs C C' $C^2$, these hubs being formed integrally upon a plate $C^3$ extending across the machine and connecting the hubs.

To the hubs C C' $C^2$ is rigidly fastened a series of arms D D' $D^2$, extending forward nearly to the front end of the main frame and supporting a type-block, which is suspended and operated in the manner hereinafter described.

The plate $C^3$ is provided with a downwardly-extending arm $c$, whose free end is pressed forward by the free end of a spring S, attached to the side piece $A^3$, a short pin P being interposed between the spring and the arm $c$ in order to avoid friction. The pressure of the spring upon the arm $c$ tends constantly to hold the front ends of the arms D D' $D^2$ at their highest limit of motion, this limit being fixed by the contact of the upper edges of the type-actuating levers with the lower face of the cross-bar $A^5$, as is hereinafter explained.

To the front ends of the arms D D' $D^2$ are journaled two frames adapted to support a type-block and to be operated by the type-actuating levers, one of said frames being made up of two parallel rods E E', connected by transverse plates $e$, and the other being made up of two parallel rods $E^2 E^3$, connected at their ends by transverse plates $e'$. Both the frames are pivoted on pins P' P', attached to the arms D $D^2$ and passed through the center of the plates $e$ $e'$, the transverse plates $e'$ of one frame being shorter than the corresponding plates $e$ of the other, and the rods $E^2 E^3$ of one frame being between the corresponding rods E E' of the other. The inner frame is provided with a central cross-bar $e^2$ and the outer frame with a similar cross-bar $e^3$, these two cross-bars being on opposite sides of the arms D', and both of them being pivoted to said arm by a pivot $P^2$, Figs. 10 and 12. A spring S', Figs. 1 and 14, has one of its ends attached to the lower face of the cross-bar $e$ of the outer frame, while its free end presses upon the upper face of said cross-bar and also upon the upper face of the contiguous cross-bar $e'$, the force of the spring tending at all times to hold the rods of the two frames in the same plane and to return them to said plane when they are oscillated out of it by the operation of the type-actuating levers.

The central cross-bar $e^3$ of the outermost-pivoted frame is provided with downwardly-extending lugs, $l$, Figs. 2 and 12, through which passes a horizontal pivot $P^3$, lying in the same vertical plane as the cross-bar, and on this pivot is hung a downwardly-extending frame F, provided at its upper end with a bearing $f$, which is journaled on the pivot.

To the lower end of the frame F is rigidly fastened a type-block G, whose lower surface is convex, its curve of convexity in the direction parallel to the oscillating arm D' being described about the pivot $P^2$, which connects the cross-bar $e^3$ with the arm D', and its curve of convexity in a transverse direction being described about the pivot $P^3$.

On the frame F, immediately below the bearing $f$, is formed or fastened a rigid bar $f'$, extending obliquely across the space between the rods $E^2$ $E^3$ of the inner oscillating frame, the ends of the bar $f'$ being immediately under said rods, Fig. 15. In the upper face of the bar $f'$ near its ends are formed small sockets which receive the lower ends of rods $h$, whose upper ends are seated in corresponding sockets in the lower surfaces of the parallel rods $E^2$ $E^3$. This construction is illustrated in Fig. 10, which is a view looking in the direction indicated by the arrow $a'$, Fig. 15, and in Fig. 11, which is a view looking in the direction indicated by the arrow $a^2$ in said figure. It is evident that if the frame E E' be oscillated about its pivots P' it will swing the type-block G about the pivot $P^2$, which is the center of oscillation of the frame and of the cross-bar $e^3$ attached thereto, and it is equally apparent that if the frame $E^2$ $E^3$ be oscillated about the pivot P' it will swing the type-block about the pivot $P^3$, which connects the block with the cross-bar $e^3$. If these two motions of the type-block can be properly controlled, they may evidently be so combined as to bring any point of its convex lower surface into a given vertical line, and since the type-block and the frames which support it are supported by the arms D D' $D^2$, which are susceptible of any desired downward movement, it may be readily seen that after any given point upon the face of the type-block has been brought into the desired vertical line the block may then be moved downward through any required distance. This is, in fact, the theory of operation of the type-block, and to accomplish this the machine is provided with a series of type-actuating levers L L' $L^2$ $L^3$, &c., such as are illustrated in Fig. 7. These levers, which are parallel to the arms D D' $D^2$, extend from front to rear of the machine, each of them being pivoted at its rear end on the transverse shaft B, while its front end rests upon one of the rods E E' $E^2$ $E^3$ of the oscillating frames and is provided with a suitable key for operating it. The weight of each of the levers is balanced by a spring $S^2$, placed between the rear end of the lever and the lower face of the cross-bar $A^4$ at the rear end of the main frame of the machine, and the upward movement of each of the levers is limited by the contact of its upper edge with the lower face of the cross-bar $A^5$, as hereinbefore mentioned, this limitation of the upward movement of these levers forming also a limitation of the upward movement of the oscillating frames which carry the type-block, and consequently of the free ends of the arms D D' $D^2$. The lower edges of the levers are so shaped as to combine in different ways and in different degrees the two motions of the type-block, and a glance at Figs. 7, 10, 11, 15, and 16 will illustrate the effect of the downward movement of one lever, as L, upon the oscillating frames and the block. The front end of the lever L rests upon the rod E' of the outer oscillating frame, and if the key K be pressed downward the form of the lower edge is such that this downward movement will first press downward the rod E', thus swinging the type-block a short distance in the direction indicated by the arrow below the type-block in Fig. 7. The lever will then strike the rod $E^3$, and the further downward movement of the lever will swing the type-block about the pivot $p^3$ in the direction indicated by the arrow in Fig. 11. As the downward movement of the lever is continued, the type-block will be swung continuously in both directions indicated until the surface of the lever comes in contact with the rods E $E^2$, when the desired point upon the lower surface of the type-block will have been brought into the vertical line passing through the point upon which it is desired to print, and a further downward movement of the lever will press the given point on the type-block downward through any desired distance. It is evident that if the type be placed or formed upon the type-block at the given point that has thus been brought into the required vertical line by the downward movement of the lever L the necessary downward movement of said lever will always bring such letter into the required vertical line, and then press the block downward through the space necessary to bring the type into contact with the surface on which it is desired to print. What has been said of the lever L is true in a general sense of all the levers, the type-block being provided with any desired number of type formed upon its convex surface, and the levers being so shaped as to bring the respective letters separately into the same vertical line and press them downward upon the paper beneath. The type-levers are supported and held in place by guide-pins $P^4$, attached to the lower face of the cross-bar $A^5$ of the main frame and extending downward between the levers.

I have found that one of the principal difficulties in the construction of a machine in which the type are formed upon a movable type-block is the tendency of the momentum of the type-block when rapidly operated to swing the type-block slightly beyond the desired point, and thereby to destroy either the alignment or the spacing of the letters. In order to obviate this difficulty, I have provided the cross-bars $e^2$ $e^3$ with upwardly-extending arms I I', provided with pins $i$ $i'$, respectively, and have attached to the cross-bar $A^5$ of the main frame a segment $I^2$, having in its upper face a series of notches $i^2$, adapted to receive the pins $i$ $i'$ of the arms I I'. The notches $i^2$ are narrower at their lower than at their upper ends, and they are so placed that when either of the pins $i$ $i'$ reaches the bottom of one of the notches $i^2$ it brings the corresponding arms I I' into a position corresponding to the exact limit of oscillation of the type-block required to bring a given letter into the vertical line in which it is desired to print. The engagement of the pins $i$ $i'$ with the notches on the segment thus corrects any errors in the motion of the type-block resulting from its tendency to swing beyond the limit required for bringing any given letter into position.

Upon the transverse extension A' of the base of the machine is a carriage having a main frame consisting of a bar H parallel with the front of the machine and two short bars H', formed integrally with the bar H and extending forward therefrom. Grooved rollers M, journaled to the bar H, rest upon the track $a$, and rollers M', journaled to the bars H', rest upon the front portion of the extension of the base, Figs. 2 and 6. A pin $P^4$ extends downward through a slot $a'$, Fig. 4, in the base of the machine, and is connected by a link $l'$ with the free end of a lever N, oscillating in a horizontal plane in the hollow space in the base. On the opposite end of the lever N is formed a cam N', which is connected by means of a strap $n$ with one end of a spring $S^2$, whose opposite end is fastened to a bell-crank lever $n'$, pivoted to the base of the machine. The bell-crank lever may be so adjusted by means of a nut and set-screw as to increase or decrease the tension of the spring, and the cam N' is of such shape that in every position of the lever the leverage with which the spring acts upon it is inversely proportional to the tension of the spring, so that the force with which the lever tends to move the carriage in the direction indicated by the arrow on the link $l'$ is practically the same at all times. A pin $P^5$ is attached to the lever N in such a position that just before the lever reaches its limit of motion in the direction indicated by the arrow the pin strikes the inclined face $n'$ of a pivoted hammer-handle $n^2$ and withdraws a hammer $n^3$ from the surface of a bell $n^4$, attached to the base. The instant after the engagement of the pin with the hammer-handle the handle is released and the hammer strikes the bell and signals the arrival of the carriage at its limit of motion. The motion of the carriage along the track is regulated by means of a letter-spacing ratchet-bar O, Figs. 2, 5, and 6, pivoted to the carriage-frame and normally held in position against a stop $o$ by a spring $S^3$, Fig. 2, fastened to the frame of the carriage. This ratchet-bar engages with a vertically-oscillating double pawl $p$ $p'$, Figs. 1 and 2, the rear end of the principal pawl $p$ being connected by a vertical link $q$ with the oscillating arm D'. Each downward motion of the arm D' depresses the rear end of the pawl and raises the front end, bringing the free end of the pawl $p$ into engagement with the teeth of the ratchet-bar, and the upward movement of the arm depresses the front end of the pawl and brings the auxiliary pawl $p'$ into engagement with the ratchet. A light spring $S^4$ presses the pawl $p'$ in the direction indicated by the arrow thereon in Fig. 1; but when this pawl comes into engagement with a tooth of the ratchet-bar the force of the spring $S^2$, which moves the carriage, overcomes the force of the spring $S^4$, and the carriage is permitted to move through the space occupied by one tooth. Thus when the arms D D' $D^2$ are pressed downward by the depression of a key-lever in the printing of a letter the pawl $p$ is in engagement with the ratchet-bar and prevents movement of the carriage; but when the arms rise after the printing of the letter the pawl $p'$ engages the ratchet-bar and the carriage moves longitudinally through the space occupied by a tooth, which corresponds to the space between two letters. The same result follows from the depression of the arms D D' $D^2$ by pressing downward a key $K^4$, attached to the arm D', Fig. 2, by means of a vertical rod passing through a slot in the cross-bar $A^4$. This depression of the arms presses the center of the type-block straight downward, and I have left the center of the type-block blank in order that it may not print when the spacing-key $K^4$ is operated. A lever O' is attached to the ratchet-bar and extends forward from it, and downward movement of the free end of this lever swings the ratchet-bar forward upon its pivot and frees the ratchet entirely from the pawl $p$ $p'$, so that the carriage may be moved freely in either direction. A stop $o'$ limits the forward movement of the ratchet-bar and the downward movement of the free end of the lever O'.

Upon the bars H' of the carriage-frame are pivoted the end pieces Q of a paper-supporting frame, the end pieces being connected by a paper-guide Q', formed integrally with the end pieces, Figs. 2, 5, 8, and 9. A roller $Q^2$ is mounted between the end pieces Q, the shaft of the roller being extended through one of the end pieces and provided with a knob $Q^3$, Fig. 5, by means of which it may be rotated.

Upon the shaft of the roller $Q^2$ is mounted a pinion T, which engages a second pinion T', mounted upon the shaft of a corrugated roller $Q^3$, each of whose corrugations occupies a space corresponding with the desired space between the lines which it is desired to print with the machine. The shaft of the roller Q³ rests in notches in the upper ends of levers q', the lower ends of said levers being journaled on the same pivots which connect the end pieces Q of the paper-carrying frame with the bars H' of the carriage-frame. The corrugated roller Q³ is held in contact with the roller Q² by springs S⁵, fastened to the end pieces Q and pressing against the levers q', the force of the springs being sufficient to press the corrugated roller firmly against the roller Q², but not sufficient to prevent the slight movement of the levers q' necessary to permit the rotation of the corrugated roller.

Upon the opposite ends of the shaft of the corrugated roller Q² are pivoted two arms u, projecting forward from the shaft and fastened at their front ends to a clasp u', which normally rests upon the roller Q². Springs S⁶, Figs. 2 and 5, attached to the paper-guide Q' and pressing against the squared rear ends of the arms u, tend to press the clasp downward upon the roller or to hold it up, if it be swung about the pivot on which the arms are journaled through an angle of about ninety degrees from its normal position. The clasp can only be raised when the paper-supporting frame Q Q' is rocked forward upon its pivot until a pin q³, set in the front face of one of the end pieces Q, strikes upon a projection H² on the bar H' of the carriage-frame. When the paper-carrying frame is thus swung forward, the clasp U' may be raised, and the edge of the paper being placed in the angle between and above the rollers Q² Q³ the rotation of the rollers in the directions indicated by the arrows on their ends in Fig. 2 draws the paper between them. The clasp U' may then be dropped down to its normal position, bringing the paper into the position illustrated in Fig. 2, in which it is drawn smoothly about the roller Q², the highest portion of the roller being immediately below the vertical axis of motion of the type-block G. The paper being thus in position beneath the type-block, it is evident that by the use of the means hereinbefore described the type-block may be so operated as to press any given type on its surface upon the paper beneath it, and it is only necessary to interpose a suitably-prepared ribbon between the type-block and the paper in order to print upon the paper impressions from the characters on the type-block. In order to provide this ribbon, I have arranged upon the machine the device illustrated in Figs. 1 and 2 in which V V are two spools mounted loosely upon a shaft B', which is journaled in the sides of the main frame of the machine and is free to move longitudinally in its bearings.

Upon the shaft B' are rigidly mounted two hubs V' V", each of which is provided on its inner face with a pin v, adapted to enter any one of a series of sockets in a hub on the outer end of the corresponding spool V. Two yokes V''', engaging grooved hubs on the inner ends of the spools V, prevent longitudinal movement of the spools, and the longitudinal movement of the shaft is sufficient to permit the bringing of either of the hubs V' V" into engagement with the contiguous hub on the corresponding spool. The shaft B' is provided with a crank, and it is evident that if the shaft be turned by means of the crank while the hub V" is in engagement with the corresponding spool, as shown in Fig. 1, the spool in engagement with said hub will rotate in the same direction as the shaft, leaving the other spool free to rotate in either direction, and, on the other hand, that if the hub V' be brought into engagement with the spool that spool will rotate with the shaft, leaving the other one idle. Grooves w are formed in the shaft B', and a yoke W is so arranged as to engage with either of said grooves and so to hold the shaft at either limit of its longitudinal movement.

In front of the shaft B' and considerably above it is a small shaft B², extending across the machine and journaled in the side pieces of the frame, and links W', rigidly fastened to the shaft, extend downward from it and receive the loosely-pivoted ends of a wire W², extending forward to form a portion of a ribbon-carrying frame. From the central portion of the wire W² extend forward two wires W³, each of which is bent into three members, a short outer member having its end joined to the wire W², a long inner member having its end also joined to the wire W², and an oblique member joining the front ends of said inner and outer members and lying in a line at an angle of about forty-five degrees to each of them. The front end of the diagonal member of each of the wires W³ is bent downwardly at its junction with the long inner member thereof, so that a ribbon passing over the diagonal member and turned under it at an angle of ninety degrees may also pass over the long inner member of the wire.

On the spools and frame thus constructed is arranged a ribbon R in the manner shown in Fig. 1. The ribbon passes from either spool forward under the wire W², over the diagonal member of the corresponding wire W³, then under said member and at right angles to its first course over the inner member of both the wires W³, under the diagonal member of the second wire W³, then over said wire and back to the second spool. The inner members of the wire W³ rest upon the paper upon the upper surface of the roller Q² and hold the ribbon out of contact with the paper except as it is pressed downward by actual contact of the type upon the type-block, the ribbon being held taut by the rotation of the shaft B², which always draws it by the rotation of one of the spools against the friction of the other.

Constant change of position of the ribbon is secured by means of the pawl-and-ratchet mechanism illustrated in Figs. 1 and 2, in which X is a ratchet-wheel and X' a pinion mounted on a short pivot B³, and X² is a gear mounted rigidly on the shaft B' and engaging the pinion X'. A bar X³, provided with a pawl held in engagement with the ratchet-wheel X by a spring S⁷, is operated by means of a lever X⁴, actuated by a pin X⁵ on the plate C³ of the main oscillating frame of the machine. Each upward movement of the arms D D' D² rotates the ratchet-wheel through the space of a single tooth, and thus moves moves the ribbon a corresponding distance in one direction or the other, according as one spool or the other is connected with the shaft B', so as to be rotated thereby.

In order to utilize the entire width of the ribbon, I have arranged the ribbon-carrying frame to be moved forward or back and secured in any desired position by attaching to the shaft B² a lever B³, Fig. 1, provided at its free end with a set-screw B⁴, which moves in a slot in the side pieces of the main frame of the machine, the set-screw and lever B³ serving as a crank, by means of which the links W' may be swung forward and back and secured at any desired point. When the ribbon-carrying frame is moved backward and the ribbon correspondingly slackened, the slack may be taken up by a turn of the crank on the shaft B'.

The operation of the entire machine is sufficiently apparent from the foregoing explanation of the operation of its various parts; but a brief recapitulation may be useful in recalling and systematizing the movements of the different elements. The first step in the use of the machine is the insertion of the paper sheet which is to receive the impression, and this insertion is accomplished by swinging the paper-supporting frame forward upon the pivot which connects it with the carriage-frame, raising the paper-clasp, placing the edge of the paper in the angle above and between the rolls Q² Q³, and rotating them in the direction indicated in Fig. 2 by turning the knob Q⁴, Figs. 2 and 17. The paper being inserted, the clasp and paper-carrying frame are returned to the position shown in Fig. 2, and the carriage is moved longitudinally to such a position as will bring the desired point upon the roller Q² immediately under the center of the type-block, thus fixing the position of the initial letter of the first line to be written. The position of the line upon the sheet may be regulated by turning the knob Q⁴ in either direction, the rotation of the knob and of the rollers Q² Q³ through a space corresponding to one of the corrugations upon the roller Q³ being sufficient to move the paper through the space between two contiguous lines. The strength of the springs which press the corrugated rollers against the paper upon the plain roller is sufficient to oppose some resistance to the rotation of the corrugated roller, so that when two contiguous ridges upon the corrugated roller are in contact with the paper an appreciable force is required to turn the knob Q⁴. The corrugations upon the roller Q³ thus form in effect a stop preventing the accidental or unintentional rotation of the rollers through more than the desired space and insuring the uniform feeding of the paper and the uniform spacing of the lines thereon. The knob Q⁴ may be turned in either direction, and the paper thus feeds either forward or back.

The longitudinal movement of the carriage upon the base of the machine is greatly facilitated by the fact that a slight depression of the lever O', attached to the ratchet-bar of the carriage, swings the bar entirely out of engagement with the double pawl P P' and permits the carriage to be moved freely in either direction. The paper being in position, the letters upon the type-block may be printed upon it in any desired order by pressing downward the keys K K' K², &c., attached to the corresponding type-levers, and thus actuating the type-block in the manner already fully described. Immediately after the printing of each letter the carriage moves through one letter-space, and additional space, whether between words or for any other purpose, may be secured by pressing downward the key K⁴, attached to the roller D' of the main swinging frame of the machine. Upon the completion of a line the signal is given by the actuation of the hammer which strikes the bell in the base of the machine, when the carriage is moved back to the desired position for beginning another line and the paper is moved through the desired space between two lines by turning the knob Q⁴. The corrugations upon the roller Q³ each occupy a space equal to the distance from the center of one line to the center of the next, as has already been stated, and the corrugations are so arranged with reference to the line of contact of the roller Q² on the type-block that each of the ridges on the roller Q³ lies in the space between two contiguous lines. Hence the corrugated roller never comes in contact with the printing upon the sheet, and there is never at any time any danger whatever either of the marring of the print or the soiling of the spaces between the lines through the transfer of ink from the printed letters to the ridges on the roller and from the ridges to the paper. During the operation of printing, the ribbon is fed by short steps from one spool to the other, the direction of motion of the ribbon being reversible at any time by the longitudinal movement of the shaft on which the spools are mounted, as has been heretofore explained. The wearing-line of the ribbon may also be varied at pleasure by moving the ribbon-carrying frame forward or back and securing it in position in the manner hereinbefore set forth.

I am aware that many of the features of the machine illustrated and described may be changed in form or replaced by equivalent devices which will readily suggest themselves to the skilled mechanic, and I desire, therefore, not to limit my invention to the combination of the particular elements or mechanical devices shown and described, except so far as they may be essential to the operation of the machine.

Having now described and explained my invention, what I claim as new, and desire to secure by Letters Patent, is—

1. In a machine of the class described, the combination, with two independently-oscillating frames having a combined bodily movement, of a type-block supported by one of said frames and susceptible of oscillation in two planes, the oscillation of one of said frames being adapted to swing the type-block in one of its planes of oscillation, the oscillation of the other of said frames being adapted to swing the type-block in its other plane of oscillation, and the combined bodily movement of the two frames being adapted to impart a corresponding bodily movement to the type-block.

2. In a machine of the class described, the combination, with a type-block susceptible of oscillation in two planes, of two independently-oscillating frames adapted by their oscillation to swing the type-block in its respective planes of oscillation and an oscillating lever having its free end in contact with one of said frames, the oscillation of said lever being adapted to oscillate said frames, respectively, through angles fixed by the form of that portion of the lever impinging upon the frames, substantially as and for the purpose set forth.

3. In a machine of the class described, the combination, with a type-block formed with type upon its face and susceptible of oscillation in two planes and of an oscillatory bodily movement, of a series of swinging key-levers, bodily-movable oscillatory frames supported in the path of said key-levers and adapted to be struck upon one side by any descending lever, thereby oscillated till the opposite side also meets the lever and then moved on bodily with the lever, and means for transmitting the motions of the frames to the type-block, substantially as and for the purpose set forth.

4. The combination, with a series of swinging key-levers, of two frames supported in the paths of the levers and adapted to be struck by any descending lever and oscillated till the lower face of the lever meets both sides of the frame and then to be moved bodily with the lever, and a type-block and connections transmitting to the type-block both the oscillatory and the bodily movements of the frames, the type upon said block being so placed that one of them shall be in the line in which it is desired to print when the oscillation produced by any lever is complete.

5. In a machine of the class described, the combination, with a type-block susceptible of oscillation in two planes, of two frames connected with said type-block and oscillating independently upon an axis susceptible of bodily movement, means for oscillating said frames, respectively, through any desired relative angles and for imparting bodily movement to the common axis of said frames, and a segment formed with suitably-spaced notches and pins attached to said frames, respectively, and adapted to be brought into engagement with the notches in said segment by the bodily movement of the axis of the frames and to form definite limits of the various degrees of oscillation of said frames, substantially as and for the purpose set forth.

6. The combination, with the frames $E$ $E'$ $E^2$ $E^3$, pivoted on a common horizontal axis susceptible of vertical oscillatory movement, of the type-block $G$, pivoted to the frame $E$ $E'$ and connected with the frame $E^2$ $E^3$ by the swivel-rods $h$ and a series of type-levers whose free ends rest upon said frames, the depression of the free end of each of the levers being adapted to oscillate the two frames through predetermined angles, respectively, and to depress the common axis of the two frames, and a fixed segment $I^2$, formed with suitably-spaced notches and arms $I$ $I'$, attached to the frames, respectively, and provided with pins adapted to engage the notches in the segment when the axis of the frame is pressed downward sufficiently, substantially as and for the purpose set forth.

7. In a paper-feeding mechanism for typewriting machines, the combination, with a paper-supporting roller, of a second roller pressed against the first by a spring or other yielding force and formed with longitudinal ridges separated by spaces corresponding to the spacing of the lines which it is desired to print, gears connecting the two rollers and insuring their reverse rotation, and means, substantially as shown and described, for rotating one of said rollers in either direction, substantially as and for the purpose set forth.

8. In a machine of the class described, the combination, with the reciprocally-moving carriage, of a frame pivoted to the carriage and oscillating transversely with reference to the path of motion thereof, a paper-supporting roller journaled in said frame, the grooved roller pressed against said paper-carrying roller by a spring or other yielding force and having its grooves of a width corresponding to the spaces desired between the lines to be printed, means for insuring the reverse rotation of said rollers, and means, substantially as shown and described, for rotating one of said rollers in either direction, substantially as and for the purpose set forth.

9. In a machine of the class described, the combination, with a suitable bed and a carriage moving reciprocally thereon, of a frame pivoted to said carriage and adapted to oscillate in the direction transverse to the line of motion thereof, a paper-supporting roller journaled to said frame and provided with a knob whereby it may be rotated, a grooved roller pressed against said plain roller by a spring and connected with it by gears, insuring their reverse rotation, a ratchet-bar pivoted to the carriage and adapted to be thrown into or out of engagement with a pawl mounted on the base of the machine, and a lever attached to one end of said ratchet-bar and extending across the knob attached to said paper-supporting roller, whereby the free end of said lever may be pressed toward said knob by the operator for the purpose of disengaging said ratchet-bar from the pawl and rendering the carriage free to move in either direction without interruption, substantially as and for the purpose set forth.

10. The combination, with the carriage-frame H H', provided with suitably-supported rollers, of the swinging frame pivoted to the carriage and made up of the end pieces Q Q and paper-guide Q', connecting the said end pieces, the roller $Q^2$, journaled to said end pieces, the roller $Q^3$, journaled in the swinging supports $q'$, pressed against the roller $Q^2$ by springs $S^5$ and provided with grooves substantially equal to the space between the lines to be printed, the paper-clasp $u'$, having arms $u$, pivoted to the oscillating frame, and springs $S^6$, adapted to hold said paper-clasp either in or out of contact with the roller $Q^2$, substantially as and for the purpose set forth.

11. In a type-writing machine, the combination, with two suitably-mounted ribbon-spools and means for rotating one of them, of ribbon-supporting rods fixed alongside and oblique to the normal path of the ribbon extended from the spools, whereby the ribbon passing around the oblique rods and in contact with it may be changed in direction, substantially as set forth.

12. In a type-writing machine, the combination, with two ribbon-spools mounted on the same shaft and a ribbon having its ends attached to said spools, respectively, of means for imparting intermittent rotation to said shaft, means for connecting one of said spools with said shaft and insuring its rotation therewith, and a frame adapted to support a portion of the ribbon intermediate between said spools and to change its course at two different points in its passage from one spool to the other, substantially as and for the purpose set forth.

13. In a type-writing machine, the combination, with a suitable printing mechanism, of a shaft journaled in the frame of the machine, two ribbon-spools mounted on said shaft, means for connecting either of said spools with the shaft, means connecting said printing mechanism with said shaft, whereby each movement of the printing mechanism shall impart a limited rotation to the shaft, and a frame supporting a portion of the ribbon between said spools and changing the course at two points in its passage from one spool to the other.

14. The combination, with the longitudinally-movable shaft B', of the spools V, loosely mounted on the shaft, the hubs V' $V^2$, rigidly mounted on the shaft and adapted to be separately thrown into engagement with the corresponding spools by the longitudinal movement of the shaft, and the frame adapted to support and guide the central portion of the ribbon and provided with wires $W^3$, having oblique members adapted to change the direction of the ribbon at two points in its course from one spool to the other, substantially as and for the purpose set forth.

15. The combination, with the shaft B', the spools loosely mounted thereon, and means for connecting said spools alternately with the shaft, of the ribbon R, having its ends attached to said spools, an adjustable frame lying in front of said spools and shaft and supporting and guiding the central portion of said ribbon, and means, substantially as shown and described, for varying the distance of said frame from said shaft and for securing it in any desired position, substantially as and for the purpose set forth.

16. The combination, with the shaft B', the spools loosely mounted thereon, and means for connecting said spools alternately with the shaft, of the shaft $B^2$, the links W', lever $B^3$, and set-screws $B^4$, rigidly fastened to said shaft, and the frame $W^2$ $W^3$, pivoted to the free ends of said links W' and extending forward therefrom, the wires $W^3$ of the frame being adapted to support and change the course of the ribbon at points between the spools, and the links W', lever $B^3$, and set-screws $B^4$ being adapted to vary the distance of the swinging frame from the shaft B' and to secure it in any given position.

17. The combination, with the shaft B, the arms D D' $D^2$, pivoted on said shaft and rigidly connected to form a frame, and a printing mechanism attached to the front end of said frame and adapted to be operated by the depression thereof, of the shaft B', the spools loosely mounted on said shaft and adapted to be alternately connected therewith, the ribbon having its ends fastened to said spools, the frame supporting and guiding the central portion of said ribbon, and means, substantially as shown and described, connecting the arms D D' $D^2$ with said shaft B', whereby the reciprocal movement of said arms imparts intermittent rotation to said shaft B' and winds said ribbon upon one of said spools and unwinds it from the other, substantially as and for the purpose set forth.

18. The combination, with the main frame of the machine, the shaft B, journaled therein, the hubs C C' $C^2$, journaled on said shaft and connected by the plates $C^3$, and the arms D D' $D^2$, attached to said hubs and forming therewith an oscillating frame, of the oscillating frames E E' $E^2$ $E^3$, pivoted to the front ends of said arms, the oscillating type-block supported by said oscillating frames, the type-levers pivoted on said shaft B and having their free ends supported by the frames E E' E² E³, and the spring S, pressing against a projection $c$ on the plate C³ and pressing upward the free ends of the arms D D' D² and the free ends of the type-levers, substantially as and for the purpose set forth.

In testimony whereof I have signed this specification in the presence of two subscribing witnesses.

DANIEL C. STOVER.

Witnesses:
JAMES H. STEARNS,
HALLIE C. ELLIS.